April 23, 1963 D. E. HILDEN ET AL 3,086,825
SHAFT SEAL
Filed July 12, 1960

INVENTOR.
Donald E. Hilden and
Jacob N. Groeneveld
BY
*Attorney*

3,086,825
SHAFT SEAL
Donald E. Hilden and Jacob N. Groeneveld, Owosso, Mich., assignors to Controls Company of America, Schiller Park, Ill., a corporation of Delaware
Filed July 12, 1960, Ser. No. 42,365
6 Claims. (Cl. 308—36.1)

This invention relates to shaft seals used in combination with self-aligning bearings specifically designed for use in fractional horsepower electric motors.

Self-aligning bearings are used in fractional horsepower motors to compensate for variations in shaft alignment which exist in mass produced motor housings. The bearing is usually seated in a recess provided in the motor end cap and assumes a final position in the end cap when mounted on the motor. The life of these bearings has been reduced because they are generally lubricated for life when assembled, and that due to inadequate motor shaft seals, the oil has been lost. Also, the bearing does not form a true seal with the cone, allowing liquids to leak into the bearing.

The primary object of the present invention is to provide a seal which will prevent the loss of oil from the bearing as well as the admittance of liquid into the bearing.

This and other objects and advantages will be pointed out in, or be apparent from, the specification and claims, as will obvious modifications of the single embodiment shown in the drawings, in which:

Figure 1:
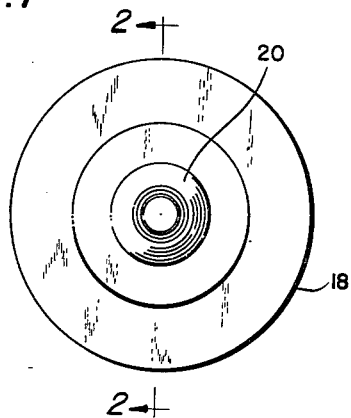
FIG. 1 shows the end plate for a motor housing.
Figure 2:
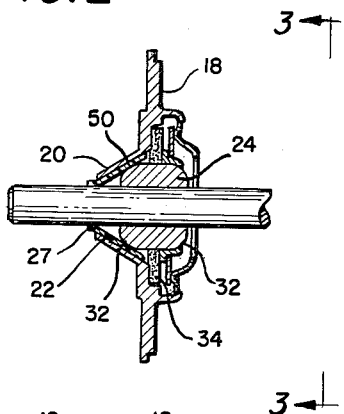
FIG. 2 is taken on line 2—2 of FIG. 1 showing the bearing and seal arrangement.
Figure 3:
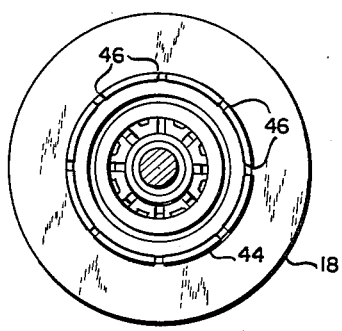
FIG. 3 is taken on line 3—3 of FIG. 2 showing the inside surface of the bearing mounting plate.
Figure 5:
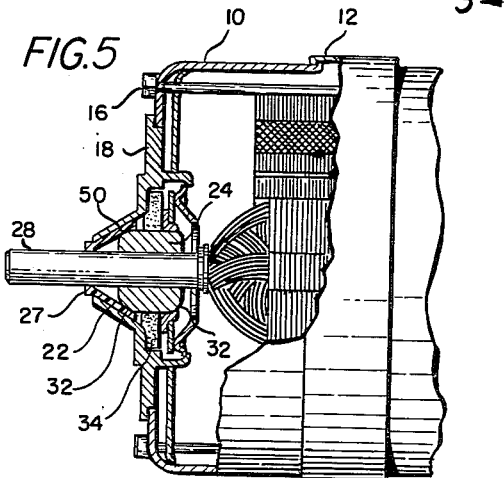
FIG. 5 is a side elevation partly in section of an electric motor showing the shaft seal in position.
Figure 4:
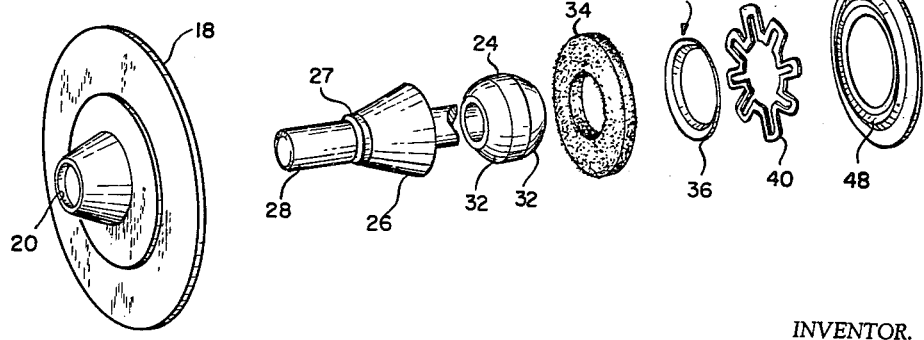
FIG. 4 is an exploded view of the bearing and seal.

As seen in the drawing, the electric motor 10 includes a sectional housing having sections 12 and 14 held together by bolts 16. Each section is provided with a motor end cap 18 apertured at 20 and bent outward to form frusto-conical seat 22 for bearing 24.

A conical seal 26 preferably made of Teflon (tetrafluorethylene) or some other material of like characteristics is positioned on the interior surface of seat 22 provided in motor end cap 18. The small end of the seat 27 has a cylindrical or sleeve portion having a diameter which is smaller than the diameter of motor shaft 28 so that a positive seal will be formed when the shaft is inserted in the seal. Bearing 24 has identical arcuate ends 32 and is positioned within the seal with one of the ends abutting the inside surface of the seal. Lubricant for the bearing is supplied from felt washer 34 which is mounted on the bearing between the end portions. A frusto-conical ring 38 is aligned with the inner end of the bearing and has a flange 36 which acts as a seat for flexible spider 40. Retaining plate 42 staked as shown at 46 in mounting ring 44 on the inside surface of the end cap is provided with an annular groove 48 which engages the outer peripheral face of the spider 40, forcing it inward to bias the bearing against seal 26 and seat 22. The aperture provided in the retaining plate is formed in the shape of a cone to provide a catcher 50 around the shaft for any lubricant which flows out of the bearing and is thrown outward by centrifugal force from the shaft. Bearings of this type are designed to compensate for variations in shaft alignment by rocking slightly on the inside surface of the seat. The bias provided by the spider will force the outer end of the bearing against the seat sandwiching the Teflon seal between the seat and bearing. Since Teflon has a resilient characteristic but does not take a permanent set, the movement of the bearing in adjusting to the alignment of the shaft when the motor is assembled will not affect the seal provided between the bearing and seat.

The conical seal will always provide a positive seal between the bearing and the seat in the end cap and the sleeve portion 27 of the seal extends along the motor shaft far enough to insure a complete seal. Because of the non-wetting characteristics of Teflon, there will be no loss of oil through the motor shaft seal due to capillary action. This characteristic also aids the return of any oil to the bearing which has been thrown off of the motor shaft onto the inner surface of the cone portion of the seal. It can also be seen that the shaft seal portion 27 will not be affected by any variation in the alignment of the shaft because of the flexible nature of Teflon.

Although but a single embodiment of the present invention has been illustrated and described, it will be apparent to those skilled in the art that various changes and modifications may be made therein without departing from the spirit of the invention or from the scope of the appended claims.

We claim:

1. A self-aligning bearing structure for an electric motor comprising, a housing element having conical bearing support, a shaft, a conical seal positioned on the inside surface of the bearing support, bearing means supporting said shaft and having curved beveled end portions, said bearing means being positioned with one of its end portions engaging the inside surface of the conical seal, lubricating means mounted on the bearing means, support means secured to the inside surface of the housing element to bias the bearing against the inside surface of the conical bearing support, sandwiching the conical seal therebetween, and dynamic seal means integral with said conical seal sealingly engaging said shaft.

2. A self-aligning bearing structure comprising a bearing seated within a bearing support, a shaft supported by said bearing, a seal shaped to complement said bearing support and positioned between said bearing and said support, said seal having a cylindrical sleeve aligned with the bearing and engaging said shaft and having an inside diameter smaller than that of said shaft.

3. A seal according to claim 2 made from a material having the characteristics of tetrafluorethylene.

4. A self-aligning bearing structure for an electric motor comprising, an end plate having a conical bearing seat portion, a bearing mounted to engage the conical bearing seat portion, means biasing the bearing toward the inside surface of the seat portion, a conical seal positioned between the bearing and seat portion, and having a cylindrical dynamic seal portion extending along and sealingly engaging the shaft.

5. In a motor having self-aligning bearings positioned in the end caps and biased into engagement with the end caps, the improvement comprising, a tetrafluoroethylene seal having a conical portion sandwiched between each bearing and its end cap and having a cylindrical dynamic seal portion adapted to sealingly engage the shaft.

6. A bearing structure for an electric motor comprising, a bearing, a motor shaft supported by said bearing, bearing support means, a conical gasket forming a static seal between said bearing and said bearing support means, and a cylindrical dynamic seal integral with said gasket sealingly engaging said motor shaft.

References Cited in the file of this patent
UNITED STATES PATENTS

| | | |
|---|---|---|
| 2,145,928 | Heinze et al. | Feb. 7, 1939 |
| 2,272,029 | Benson | Feb. 3, 1942 |
| 2,284,869 | Hinderliter | June 2, 1942 |
| 2,568,056 | Corder | Sept. 18, 1951 |
| 2,668,086 | Marzolf | Feb. 2, 1954 |
| 2,747,834 | Meusy | May 29, 1956 |
| 2,765,023 | Fagg et al. | Oct. 2, 1956 |
| 2,804,324 | Stallings | Aug. 27, 1957 |
| 2,878,046 | Latzen | Mar. 17, 1959 |